United States Patent [19]

Davis et al.

[11] 4,022,424

[45] May 10, 1977

[54] SHAFT BEARING AND SEALS FOR BUTTERFLY VALVES

[75] Inventors: Donald H. Davis, Scotia; John G. Mossey, Waterford, both of N.Y.

[73] Assignee: General Electric Company, Schenectady, N.Y.

[22] Filed: Sept. 29, 1975

[21] Appl. No.: 617,818

[52] U.S. Cl. .............................. 251/214; 251/305; 277/30; 277/53; 308/36.1; 308/72
[51] Int. Cl.² ........................................ F16K 31/44
[58] Field of Search .......... 251/214, 215, 304, 305, 251/308; 277/3, 15, 30, 53, 54, 55, 56, 57, 59, 65; 137/340; 308/36.1, 72, 237 R

[56] References Cited

UNITED STATES PATENTS

| | | | |
|---|---|---|---|
| 2,709,629 | 5/1955 | Ledinegg | 277/55 |
| 2,860,895 | 11/1958 | Mosbacher | 277/30 |
| 2,990,220 | 6/1961 | Malone | 277/65 |
| 3,591,188 | 7/1971 | Eisner | 277/65 |
| 3,604,206 | 9/1971 | Baily | 277/15 |
| 3,642,024 | 2/1972 | La Coste et al. | 137/340 |
| 3,871,223 | 3/1975 | Kralowetz | 308/72 |

*Primary Examiner*—Martin P. Schwadron
*Assistant Examiner*—G. L. Walton
*Attorney, Agent, or Firm*—James W. Mitchell; John F. Ahern

[57] ABSTRACT

A butterfly valve comprises a valve disc mounted on and rotatable with a shaft disposed across the inner diameter of a cylindrical valve casing, said shaft being rotatably supported at each end by a bearing within the valve casing. Fluid flow through the valve casing is controlled by rotating the valve disc from a fully open position through a fully closed position. A shaft seal and bearing is disclosed which prevents leakage of the controlled fluid out of the valve casing axially along the valve disc shaft even under conditions of shaft flexure. Moreover, the shaft seals adjust to the shaft flexure to obviate binding between the shaft and shaft seals.

7 Claims, 1 Drawing Figure

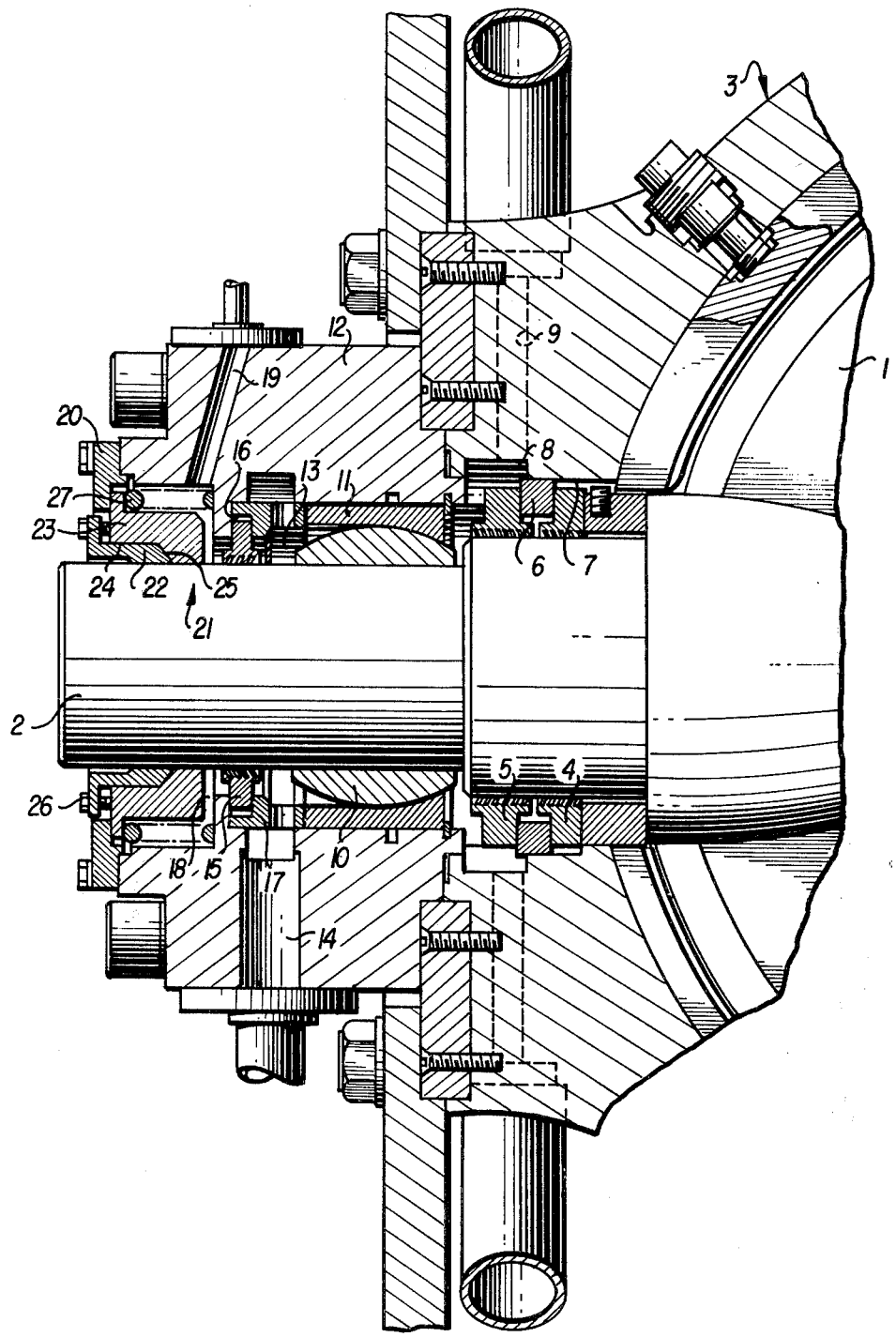

SHAFT BEARING AND SEALS FOR BUTTERFLY VALVES

BACKGROUND OF THE INVENTION

This invention relates, in general, to shaft seals and bearings for a rotatable shaft disposed within a casing. In particular, this invention relates to a butterfly valve construction.

Butterfly valves used for controlling the flow of steam into a modern steam turbine is a relatively new application of an old well-known device. However, the introduction of the butterfly valve into steam turbine technology requires improvements not found in the prior art due to relatively high steam temperatures and pressures coupled with control system requirements that the valve be highly reliable and fast-closing. Moreover, in the case wherein the steam generator is a nuclear reactor, it is required that there be no steam leakage from the valve because of possible radioactive contamination.

One possible steam leakage path out of the valve casing is axial steam leakage along each shaft end and the valve casing portion wherein each shaft end is rotatably supported. Further complicating the steam leakage problem is shaft flexure or bending caused by the high-pressure steam flow. The occurrence of shaft flexure may further aggravate the problem of shaft leakage while contributing to binding between the shaft and shaft seals.

It is therefore the object of the present invention to provide a highly reliable, fast-closing butterfly valve wherein the leakage of controlled fluid along the valve disc shaft axis, out of the valve casing, is eliminated under conditions of high steam pressure and shaft flexure.

SUMMARY OF THE INVENTION

In accordance with the foregoing object of the invention, a shaft seal and bearing is provided at each end of a butterfly valve disc shaft. Proceeding in a radially outward direction along the axis of the shaft, the present invention comprises first and second floating seal rings in combination with a stationary seal ring. Downstream therefrom, along the axis of the shaft in a radially outward direction from the valve disc, is a first pressure chamber having connected thereto a conduit for either drawing off leakage steam from or applying clean steam to the first pressure chamber. Downstream from the first pressure chamber is a bearing and bearing seat which itself provides an axial leakage seal. A second pressure chamber downstream from the bearing and bearing seat provides a second steam leak-off or a clean steam seal. Further, a third floating seal ring provides a seal downstream from the second pressure chamber. Following the third floating seal ring is still another pressure chamber. Finally, at the radially outermost portion of the shaft with respect to the valve disc, there is an adjustable, spring-biased, shaft packing.

BRIEF DESCRIPTION OF THE DRAWING

The DRAWING is a cross section of a portion of a butterfly valve casing showing the details of a shaft seal and bearing according to the present invention.

DETAILED DESCRIPTION OF THE INVENTION

The drawing shows a cross section of a butterfly valve portion including a butterfly valve gate or valve disc 1, fixed to a shaft 2 which is rotatably supported within a valve casing 3. Of course, the shaft has another opposite end (not shown) which is similarly mounted on an opposite side of the valve casing. A first sealing means is provided along shaft 2 comprising in combination a first annular "floating" labyrinth seal ring 4 and a second annular "floating" labyrinth seal ring 5. The first and second floating labyrinth seal rings surround and slidably engage shaft 2 along their resepctive radially inner packing teeth. A stationary seal ring 6 has opposite faces which slidably abut rings 4 and 5 respectively to further comprise the first sealing means. Ring 6 has an outer circumference which engages an inner circumference of a shaft bore 7. This first sealing means imparts several unexpected advangages not found in the prior art. Under conditions of shaft flexure wherein the shaft may bow slightly in the direction of fluid flow through the valve casing, floating seals 4 and 5 will travel with the shaft. This obviates any binding between the shaft and the floating seals which would occur if the shaft seals were fixed. The stationary seal ring between the floating seal rings does not inhibit shaft movement in the radial direction since the inner diameter of seal ring 6 is somewhat larger than the outer diameter of the shaft. The arrangement of seals is effective against the axial leakage of controlled fluid out of the valve casing since under all conditions of shaft flexure the sealing means engages both the shaft and the inner diameter of shaft bore 7. Furthermore, any axial leakage of fluid will tend to close the sliding interfaces between seal rings 4 and 6, and seal rings 6 and 5 respectively.

Proceeding further outwardly along the valve disc shaft a first annular pressure chamber 8 surrounds the second floating seal ring and continues downstream therefrom. The purpose of the first annular pressure chamber is to leak-off any leakage fluid which may pass through the first sealing means. Accordingly, chamber 8 is at a lower pressure level, by means of conduit 9, than any leakage fluid which may pass through the first sealing means. Conduit 9 may be connected to a suitable collecting vessel (not shown). Alternatively, pressure chamber 8 could be at a higher pressure than that of any leakage fluid past the first sealing means whereupon chamber 8 could be pressurized with "clean" steam to provide a pressure seal.

Outboard from the first pressure chamber, each shaft end is supported by a spherical bearing assembly comprising a bearing 10 and seat 11. The seat 11 is fixed to an outer portion 12 of the valve casing. The spherical bearing assembly provides an additional shaft seal against axial leakage while accommodating shaft flexure without any binding because of the self-centering action of the bearing with respect to the seat.

A second annular pressure chamber 13 is located axially downstream from the spherical bearing assembly with respect to any axial shaft leakage of steam. The second annular pressure chamber includes a "clean" steam input thereto through conduit 14 which may be connected to a suitable source (not shown). The "clean" steam in chamber 13 is at a higher pressure than any anticipated leakage fluid. Alternatively, second annular pressure chamber 13 may be adapted to leak-off fluid passing through the spherical bearing assembly in a manner described with respect to the first annular pressure chamber.

A second sealing means includes a third floating labyrinth seal ring 15 provided downstream with respect to axial fluid leakage to the second annular pressure chamber 13. This third floating seal ring is housed in an annular recess 16 partially defined in an annular ring 17 which is attached to the outer portion 12 of the valve casing. The outer diameter of the seal ring 15 is less than the inner diameter of recess 16 so that the ring may float with the shaft under conditions of shaft flexure, once again obviating any shaft to seal binding which would occur if the floating rings were fixed to the valve casing.

A third annular pressure chamber 18 is provided axially downstream from the second sealing means for leaking off any axial leakage fluid traveling axially along the shaft. The chamber 18 communicates with passage 19 to a suitable collector vessel (not shown). The pressure in chamber 18 is thus maintained at a lower level than that of any axial leakage fluid which may be present downstream from seal ring 15. Alternatively, pressure chamber 18 may be at a higher pressure level than the pressure level of any leakage fluid.

A third sealing means is provided at each outer end of shaft 2. The third sealing means comprises an annular flange 20 suitably fastened to the outer portion 12 of the valve casing. An annular packing member 21 is disposed within the annular flange and includes, with respect to the shaft axis, a radially inner packing ring 22 and a radially outer packing ring 23 having slidable interfaces 24 and 25. A plurality of bolts 26 adjustably retain the inner packing ring relative to the outer packing ring whereas both rings bear against the shaft outer circumference. The inner and outer packing rings are retained in place by a coil spring 27. Tightening of bolts 26 causes the inner packing ring to be jammed against outer packing ring 23 at interface 25 which forces the inner packing ring against the shaft while tightening the seal interface. Moreover, this arrangement of parts within the shaft bore allows for shaft flexure while avoiding shaft-to-seal binding. Moreover, spring 27 prevents any leakage from between outer ring 23 and annular flange 20.

While there is shown what is considered, at present, to be the preferred embodiment of the invention, it is, of course, understood that various other modifications may be made therein. For example, the arrangement of the first pressure chamber at a lower pressure level than leakage fluid; the second pressure chamber at a higher pressure level than leakage fluid; and, the third pressure chamber at a lower pressure level than the leakage fluid could be modified to all chambers at a high-pressure level or to all chambers at a low-pressure level or any other combination thereof. It is intended to claim all such modifications as fall within the true spirit and scope of this invention.

What is claimed is:

1. A butterfly valve for controlling a fluid flow through a conduit, said butterfly valve comprising a valve casing having a shaft extending through and rotatably mounted within the valve casing; a gate rotatable with said shaft and supported thereby, said gate disposed across said valve casing; and, said shaft supported at each opposite end in a bore formed through said valve casing, said butterfly valve further comprising:

first sealing means disposed within each bore adjacent said valve gate for providing an annular seal between said shaft and said bore to prevent the axial leakage of controlled fluid out of the valve casing; said first sealing means allowing radial movement of said shaft within said valve casing bore;

a first pressure chamber downstream from said first sealing means with respect to axial leakage flow; said pressure chamber having a pressure level differing from the pressure level of axial leakage flow;

a spherical bearing assembly downstream from said first pressure chamber for rotatably supporting each shaft end;

a second pressure chamber downstream from said spherical bearing assembly with respect to said axial leakage flow; said second pressure chamber having a pressure level differing from the pressure level of axial leakage flow;

a second sealing means downstream from said second pressure chamber with respect to axial leakage flow, said second sealing means providing an annular seal between said shaft and said bore to prevent the axial leakage of controlled fluid; said second sealing means allowing radial movement of said shaft within said valve casing bore;

a third pressure chamber downstream from second sealing means with respect to said axial leakage flow; said third pressure chamber having a pressure level differing from the pressure level of axial leakage flow; and, a third sealing means downstream from said third pressure chamber with respect to axial leakage flow, said third sealing means providing an annular seal between said shaft and said bore to prevent the axial leakage of controlled fluid out of the valve casing bore.

2. The valve recited in claim 1 wherein said first sealing means comprises:

a first seal ring surrounding said shaft having a radially inner circumference engaging said shaft;

a second seal ring surrounding said shaft having a radially inner circumference engaging said shaft, said second seal ring disposed downstream from said first seal ring with respect to axial leakage flow;

a third seal ring surrounding said shaft having a radially outer circumference engaging said valve casing bore, said third seal ring disposed between said first and second seal rings in sliding abutment therewith whereby an annular seal is formed between said shaft and said bore and radial movement of the shaft is permitted.

3. The valve recited in claim 1 wherein said first and third pressure chambers are at a pressure level lower than axial fluid leakages which may occur past the first and second sealing means respectively.

4. The valve recited in claim 1 wherein said second pressure chamber is at a pressure level higher than axial fluid leakage which may occur past the spherical bearing assembly.

5. The valve recited in claim 1 wherein the second sealing means comprises:

an annular ring member depending radially inwardly from said valve casing bore; and, a seal ring having a radially inner circumference engaging said shaft and a radially outer portion slidably engaging said ring member whereby an annular seal is formed which permits radial movement of said shaft within said bore.

6. The valve recited in claim 1 wherein the third sealing means comprises:
- an annular flange surrounding said shaft and attached to said valve casing;
- a packing member disposed within said bore engaging said annular flange and said shaft; said packing member comprising a radially inner packing ring and a radially outer packing ring adjustably secured together; and,
- a coil spring surrounding said shaft and resiliently urging said outer packing ring against said annular flange whereby an annular seal is formed which permits radial movement of said shaft within said bore.

7. In an improved butterfly valve for controlling a fluid, said butterfly valve having a casing, a shaft extending through and rotatably mounted within said casing and a butterfly disc fixed to said shaft, the improvement comprising:
- a first sealing means disposed around said shaft between said shaft and said casing for restricting any flow of fluid leaking between said shaft and said casing;
- a first pressure chamber disposed around and communicating with said first sealing means for applying a fluid pressure about the shaft surface less than that of any leakage fluid through said first sealing means;
- a spherical bearing assembly disposed around said shaft adjacent said first pressure chamber for supporting said shaft and providing additional sealing against leakage while accommodating any shaft flexure;
- a second pressure chamber disposed around said shaft adjacent said bearing assembly for applying a fluid pressure about the shaft surface greater than that of any fluid which leaks past said first sealing means, said first pressure chamber, and said bearing assembly;
- second sealing means disposed around said shaft adjacent said second pressure chamber for restricting the flow of any fluid which leaks past said first sealing means, said first and second chambers and said bearing assembly;
- a third pressure chamber disposed around said shaft adjacent said second sealing means for applying a fluid pressure about the shaft surface less than that of fluid which leaks past said first and second sealing means, said first and second pressure chambers and said bearing assembly; and
- third sealing means disposed around said shaft adjacent said third pressure chamber for restricting the flow of any fluid which leaks past said first and second sealing means, said first, second and third pressure chambers and said bearing assembly.

* * * * *